455/6

United States Patent

[15] 3,651,403

[45] Mar. 21, 1972

Fluck, Jr.

[54] SIMULTANEOUS SWEEP TESTING SYSTEM FOR CATV

[72] Inventor: Sidney Fluck, Jr., Levittown, Pa.

[73] Assignee: Jerrold Electronics Corporation, Hatboro, Pa.

[22] Filed: May 18, 1970

[21] Appl. No.: 38,295

[52] U.S. Cl. ..............................325/31, 178/DIG. 4, 325/67, 324/57

[51] Int. Cl. ..........................................H04h 1/04, H04b 3/46

[58] Field of Search ............................178/DIG. 4, DIG. 13; 179/175.2 R, 175.2 C, 175.3; 324/57 DE, 57 FP, 57 SS; 325/31, 67, 363

[56] References Cited

UNITED STATES PATENTS 2,738,417 3/1956 Hunt et al. ..............................325/67

2,987,586 6/1961 Berger ....................................325/67

OTHER PUBLICATIONS

Telephone Engineer and Management; Nov. 15, 1965; Vol. 69, No. 22; pp. 37–41

*Primary Examiner*—Benedict V. Safourek

*Attorney*—Sandoe, Hopgood and Calimafde

[57] ABSTRACT

An apparatus and method for applying a test sweep signal onto a CATV line during full operation of the system without introducing observable distortion at the television receivers. The test signal is in the form of a series of discrete frequency-swept pulses of a predetermined duration appearing at a predetermined rate.

16 Claims, 6 Drawing Figures

INVENTOR
SYDNEY FLUCK, JR.
BY
Sandoe, Hopgood & Calimafde
ATTORNEYS

INVENTOR
SYDNEY FLUCK, JR.
BY
Sandoe, Hopgood & Calimafde
ATTORNEYS

INVENTOR
BY SYDNEY FLUCK, JR.

Sandoe, Hopgood & Calimafde
ATTORNEYS

INVENTOR
BY SYDNEY FLUCK, JR.
Sandoe, Hopgood & Calimafde
ATTORNEYS

SIMULTANEOUS SWEEP TESTING SYSTEM FOR CATV

The present invention relates generally to communication systems, and more particularly to a system for evaluating and monitoring the operating characteristics of the distribution of a CATV system or the like.

In many sections of the country, reception of commercially broadcast television signals is inadequate for acceptable viewing. In these locations, excellent television reception is provided through the use of community antenna television (hereinafter CATV), in which an antenna located at an appropriate location and elevation receives the broadcast commercial television signals, processes and then retransmits the broadcast signals through cables to the television receivers located in the homes of the CATV subscribers.

The CATV antenna and signal processing station, commonly referred to as the head end, includes means for reducing the noise levels of the received broadcast signals and for amplifying and combining these signals for transmission over the CATV cables. To compensate for the amplitude loss of the combined television signals in the cables, amplifiers are located at spaced intervals along the cables.

To ensure optimum performance of the CATV system, tests must be periodically performed on the system and particularly over that portion of the system between the head end and home receivers. These tests are primarily concerned with ensuring that the signal level along the cable is proper, and that the frequency response of the cable-amplifier transmission system is proper over the entire frequency of range of interest, e.g., the frequency range covered by the VHF amplifying system used.

It is the present accepted procedure to monitor the performance of a CATV system by transmitting a frequency swept test signal varying at a 60-cycle rate down the cable transmission line, and then monitoring the response of the system to that swept signal at test points provided at different locations along the line. The most significant disadvantage of the present test procedure is that it produces intolerable interference with the subscriber's reception of the television signals. To avoid such interference with the received signals, regular broadcast transmission must be shut down during the performance of the monitoring procedure on the CATV system, and the sweep signals test for CATV systems are thus almost always performed during the early hours of the mornings when most subscribers are not viewing their receivers. While this expedient avoids the undesirable interference with the subscribers' reception, the necessity for performing the tests during the morning hours is a source of obvious inconvenience and additional costs to the operator of the CATV system. The latter are inevitably reflected in increased costs to the subscriber.

Another difficulty in the practice of the known CATV monitoring procedures is that the repetition rate and duration of the standard swept test signal are of values such that traps such as notch filters must be inserted along the line at the AGC frequencies to avoid disturbance of the system AGC loop. The need for such notch filters further adds to the costs of the monitoring operation.

It is an object of the present invention to provide an apparatus and method for monitoring a CATV system or the like which can be employed without interrupting normal system operation.

It is a further object of the invention to provide an apparatus and method of the type described in which the inconveniences and disturbances of the presently employed CATV test procedures on the received television signals are substantially eliminated.

It is a more specific object of the present invention to provide a CATV test and monitoring system of the type described, in which the tests can be performed while the system is in operation without introducing perceptible interference at the subscriber's receivers.

It is yet another object of the present invention to provide a CATV monitoring procedure in which the AGC of the system is substantially unaffected without requiring the insertion of notch filters at the AGC frequency along the CATV transmission cable.

To these ends, the present invention proposes a novel approach to the monitoring of a CATV system transmission line between the system head end and receivers. In accord with the present invention, at broadly considered, the test signal transmitted down the cable system is in the form of frequency-swept pulses of a predetermined, relatively short, duration occuring at a preselected rate such that the period between test pulses is significantly greater than the duration of each swept pulse.

The duration of the swept pulse is made as short as possible so that even when the test frequency-swept pulse is transmitted through the cable system along with the regular broadcast signal, the interference to the received broadcast television signal will be practically imperceptible. Moreover, the duration of the test pulses is sufficiently short so that disturbance of the system AGC is avoided without the provision of additional filter traps.

The test pulses are swept for a brief predetermined period, such as 2 ms., between 45 mHz. and 245 mHz. The period of the test pulses can be set at any desired level, such as 1, 2, 5, 10 or 20 seconds. As a result, the sweep is present for 60$\mu$ sec. for each broadcast channel, and will appear on only one line in a given frame or raster. Moreover, the position of the line in the raster is completely random, and as a result, the interference resulting from the presence of the test pulse on the line will be substantially imperceptible to all but the trained observer.

Also disclosed herein are a novel test transmitter and receiver having circuitry specially designed and adapted for optimum employment of the monitoring procedure of the invention. Included among these circuits is a novel diode switch for selectively applying the test pulses for transmission along the cable system, and a novel detector-amplifier and trigger generator for use at the test receiver.

To the accomplishment of the above, and to such further objects as may hereinafter appear, the present invention relates to an improved apparatus and method for monitoring the operation of a CATV transmission line, substantially as defined in the appended claims and described in the following specification taken together with the accompanying drawings in which:

Figure 1:
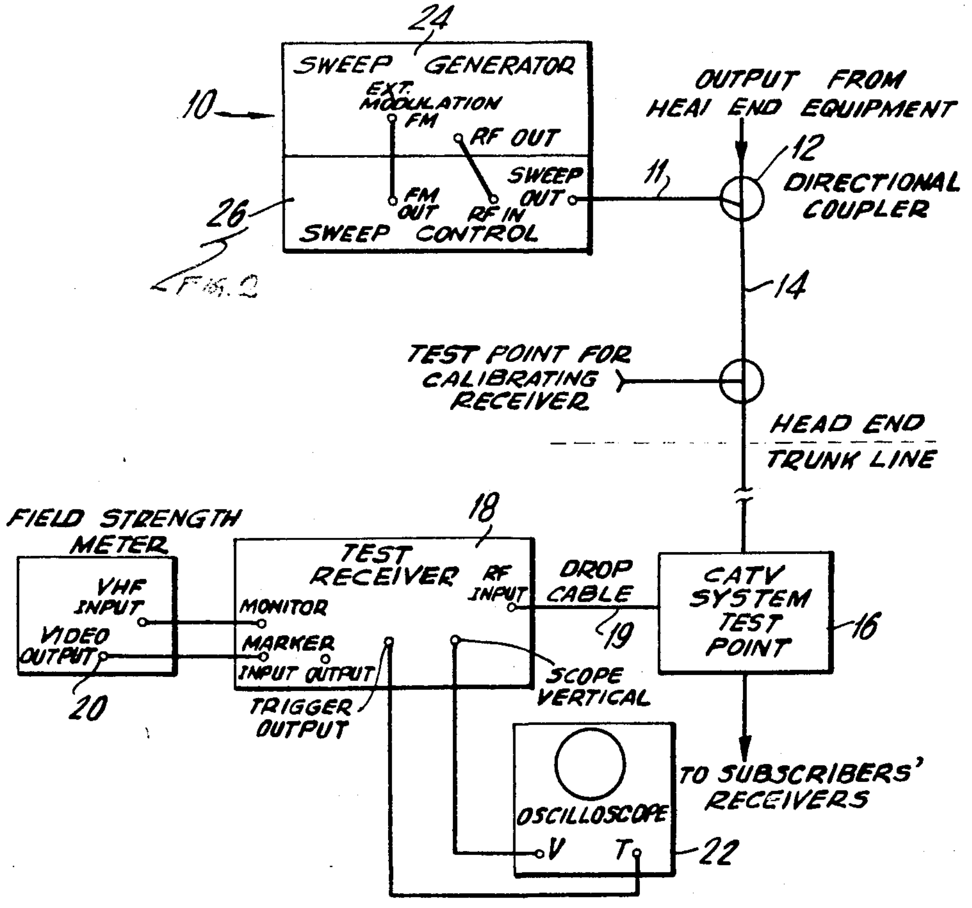
FIG. 1 is a simplified diagram in block form of the apparatus of the invention.

In the CATV monitoring system of the invention, test signals are introduced into the transmission line at the head end of the system simultaneous with the normal television broadcast signals, and are detected at test points located at spaced locations provided along the line between the head end and the subscribers' receivers. As shown in FIG. 1, the test signals are derived from a signal generator 10 which applies by a cable 11 the test signals through a directional coupler 12 onto the CATV transmission cable 14.

The sweep test signals are combined at coupler 12 with the system broadcast signals obtained from the conventional CATV head end signal processing equipment (not shown).

The combined test and broadcast signals are transmitted along line 14 to the subscribers' receivers (also not shown). Along line 14 a number of test points such as 16 are provided to monitor the operation of the line, with specific reference to its gain and frequency response characteristics. Test point 16 is coupled to a test receiver 18 by a drop cable 19. Receiver 18 provides an R-F signal to a field-strength meter 20, which provides an indication of signal level; and to an oscilloscope 22 on which a display of the frequency-gain characteristic of the transmission line system over the frequency range of interest, e.g., the frequency range of the VHF system, is provided.

In accordance with the present invention, the test signals produced by transmitter 10 are in the form of narrow frequency-swept pulses having a frequency range covering the VHF range 45–300 mHz. and occurring at a predetermined rate, such that the period between the test pulses greatly exceeds the duration of each of the pulses.

The duration of the pulse is made as short as is feasible, to reduce the perceptibility of the test pulse at the home receivers. However, the narrower the test pulse, the greater is the required bandwidth of test receiver 18, and increasing the receiver bandwidth also increases the receiver noise level. As a result, in a practical application of the invention, a test pulse width of approximately 2 ms. was found to be highly suitable for use in a CATV monitoring procedure.

Figure 2:
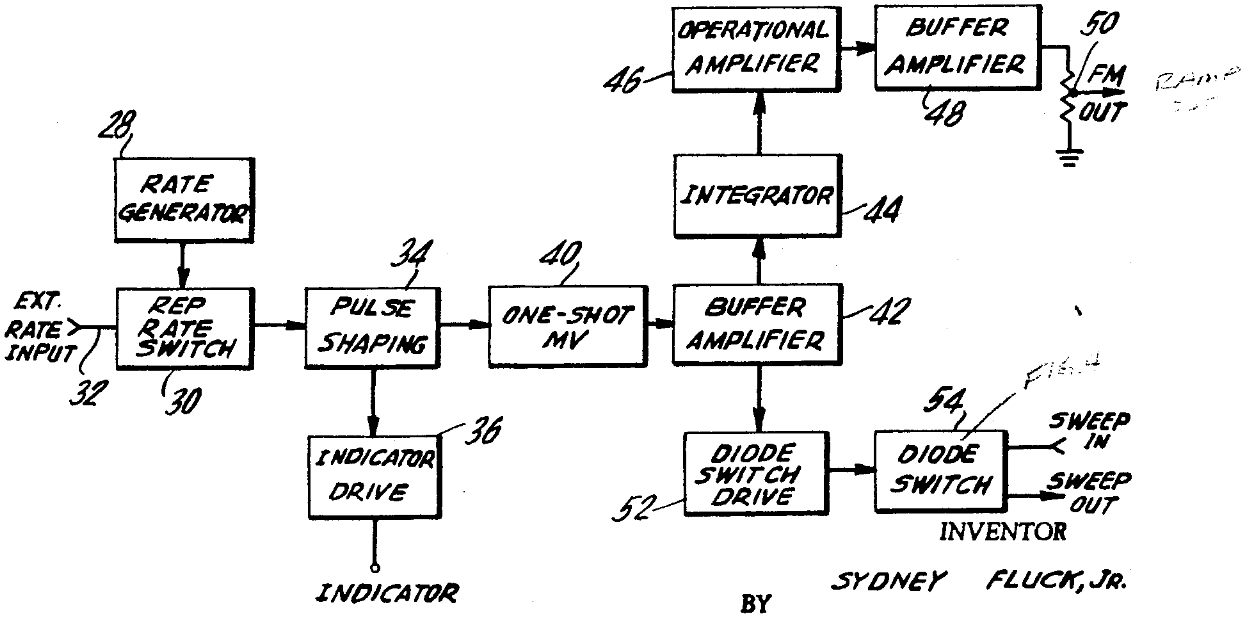
FIG. 2 is more detailed schematic diagram in block form of the transmitter portion of the apparatus of FIG. 1.

Transmitter 10 includes a sweep generator 24 whose instantaneous frequency is dependent on the level of an input drive signal obtained from a sweep driver 26, the latter being illustrated in greater detail in FIG. 2. Referring now to FIG. 2, driver 26 comprises a rate generator 28 which may include a Schmitt trigger, an operational integrator and an emitter follower. Generator 28 produces a series of square wave pulses, whose rate is determined by the operation of a repetition rate switch 30. The latter may be set, for example, to produce pulses at intervals of 1, 5, 10 or 20 seconds. An additional setting may be provided to enable the test pulse to be derived from an external pulse source as indicated at input line 32.

The pulse output of switch 30 is applied to a pulse shaper 34 which adjusts the phase and amplitude of the pulses. The output of pulse shaper 34 is coupled to an indicator drive 36 which actuates an indicator lamp 38 whenever a test pulse is present. The output of pulse shaper 34 is also applied to a one-shot multivibrator 40 which, when triggered by the input pulse, produces a timing pulse having a predetermined pulse width or duration, e.g., 2ms. The timing pulse is coupled through an isolating or buffer amplifier 42 to an integrator 44 which produces a 2 ms. ramp signal. The ramp signal is applied to an operational amplifier 46, and the thus amplified ramp signal is applied through an isolating buffer amplifier 48 and a potentiometer 50 to the frequency control terminal of sweep generator 24. A frequency control on sweep generator 24, along with potentiometer 50, integrator 44, and amplifier 46 on sweep driver 26, are all preset so that the output of sweep generator 24 is swept from preselected initial frequency, such as 45 mHz., to a final frequency of 300 mHz. in a period of 2 ms., to wit, the width of the ramp produced by integrator 44.

The output of buffer amplifier 42 is also applied to a diode switch driver 52 which in turn couples the pulse to a diode switch 54, which is more completely described below with reference to FIG. 4. Diode switch 54 also receives the f.m. modulated, frequency-swept signal from sweep generator 24. Switch 54 is rendered operative during the 2 ms. period of the input pulse, and during that "on" period passes the sweep signal to a switch output which is coupled to the summing coupler 12 where the swept test pulse is combined with the normal CATV broadcast signal as described above.

During the period when switch 54 is in the inoperative or "off" state, the diode switch presents a high impedance to the sweep signal output of generator 24, and provides a good impedance match to cable 11, as will be more completely set forth below.

Figure 3:
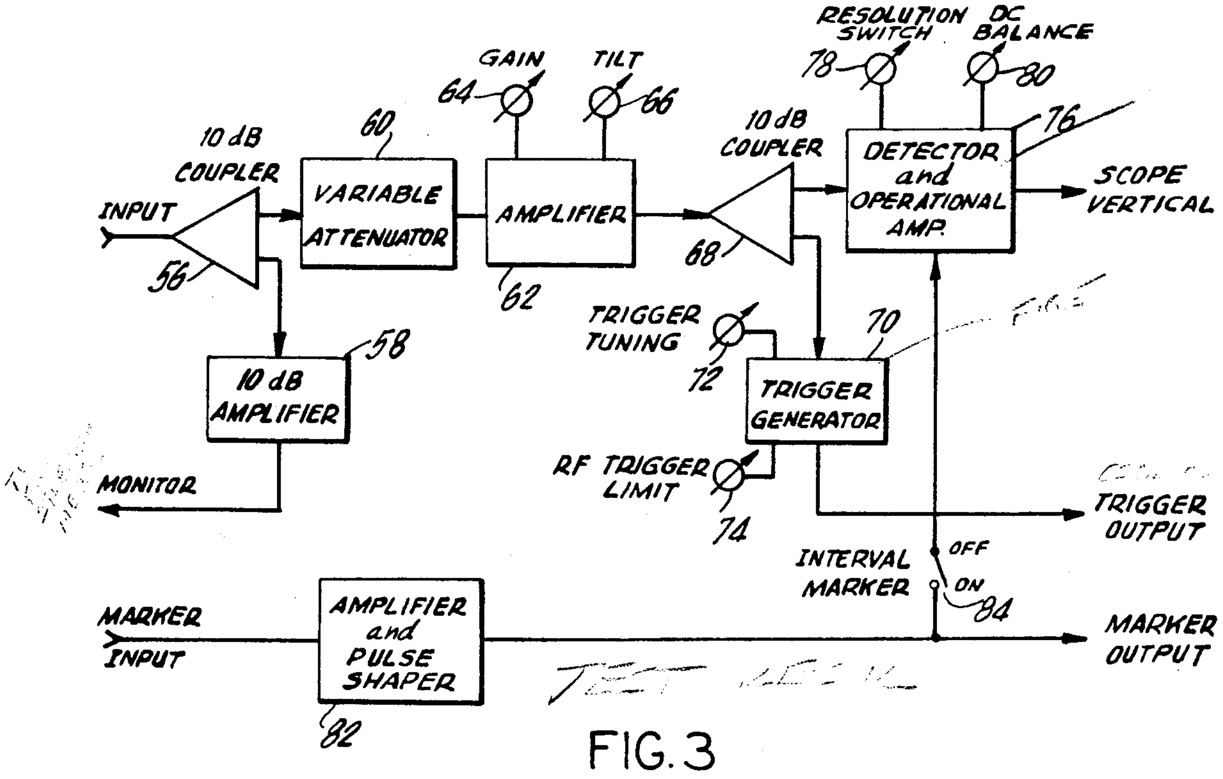
FIG. 3 is a more detailed schematic diagram in block form of the receiver portion of the apparatus of FIG. 1.

Test receiver 18, illustrated in greater detail in FIG. 3, receives the input from test point 16 at a 10 db. coupler 56 which passes through its tap output, the combined R-F signal at a 10 db. reduced level to a 10 db. amplifier 58. Amplifier 58 restores the combined test and broadcast R-F signal to its initial level. The amplified signal is then coupled to field strength meter 20 at which the level of the signal can be observed and recorded. Since the test pulse only appears every 1, 5, 10, or 20 seconds, and the test pulse duration in the selective range of meter 20 is only a few $\mu$sec., the test pulse contribution to the reading of meter 20 can be considered to be negligible. As a result the field strength meter provides an accurate reading of the broadcast signal level that is substantially unaffected by the presence of the test signals along the line. The gain of amplifier 58 is preferably variable to compensate for losses in coupler 56 so that meter 20 accurately reads the level of the broadcast signal applied to the coupler.

The main output of coupler 56 is coupled through a variable attenuator 60 to an amplifier 62. Amplifier 62 includes separate gain and tilt controls 64 and 66 which may be adjusted during receiver calibration to compensate for the frequency rolloff characteristics of the drop cable 19. The output of amplifier 62 is coupled to another 10 db. coupler 68.

The tap output of coupler 68 is coupled to a trigger generator 70 which is more completely described below with reference to FIG. 5. Briefly described, generator 70 includes an amplifier tunable over the 45–55 mHz. range by means of a trigger tuning control 72. When the sweep signal from coupler 68 passes through the tuned frequency a trigger pulse is generated. That pulse in turn is applied to oscilloscope 22 where it is used for triggering the display on the oscilloscope. As will be described in greater detail below, the low frequency limit of the trigger tuning control is established by the R-F trigger limit control 74, such that the trigger pulse is generated at the selected low frequency even when the signal level at that frequency is 10 db. down from the minimum (e.g., OdBmv) at test point 16. This permits the oscilloscope to be triggered on the skirt of the frequency response curve and thus establishes the low-frequency limit of the oscilloscope display at the initial portion of the desired frequency-response display.

The main output of coupler 68 is applied to the input of a sensitive, temperature-compensated detector and operational amplifier 76 which is more completely described below with reference to FIG. 6. The function of detector-amplifier 76 is to detect the combined test and broadcast signal transmitted along the cable, and to produce a video signal for display on oscilloscope 22. That display provides an indication of the frequency response of the transmission cable system over the entire frequency range of interest. The level of the frequency-response display also provides an accurate indication of the test signal level at the receiver test point. Attenuator 60 may be set to establish a reference level of the display as viewed at oscilloscope 20. The test signal can then be readily correlated to the attenuator setting in a manner known to those skilled in the art.

As will be more completely described below, the video bandwidth of detector 76 may be selected by the operation of a resolution switch 78 to either a low value (e.g., 10 kHz.) for normal resolution, or to a high value (e.g., 50 kHz.) for improved resolution. Since the level of the test signal is 17–20 db. above the normal broadcast signals, there is no significant affect on the test signal display by the broadcast signals, particularly when the detector is switched into its low resolution mode. To further reduce the effects of the broadcast signals on the test signal display, traps may be introduced to reject the 15.750 kHz. and 31.500 kHz. line sync signals. The use of the higher bandwidth permits better resolution of discontinuities but also allows a greater amount of the broadcast video signals to appear on the display, which is usually undesirable. The operational amplifier portion of detector-amplifier 76 may be balanced by the operation of a DC balance control 80.

Field strength meter 20 may be utilized to produce a display marker for the frequency-response display on oscilloscope 22 whenever it is desired to precisely locate a selected frequency on the oscilloscope display. To this end, a video marker signal is produced by meter 20 when the test sweep signal passes through the frequency at which meter 20 is selectively tuned. That marker signal is applied to test receiver 18 where it is amplified and shaped in amplifier-shaper 82. When it is desired to utilize the marker pulse in combination with the test sweep display, an internal marker switch 84 is placed in the "ON" position to thereby apply the marker pulse to the detector circuitry in detector-amplifier 76, where it is added to the detected system response of the test signal for display therewith.

Figure 4:
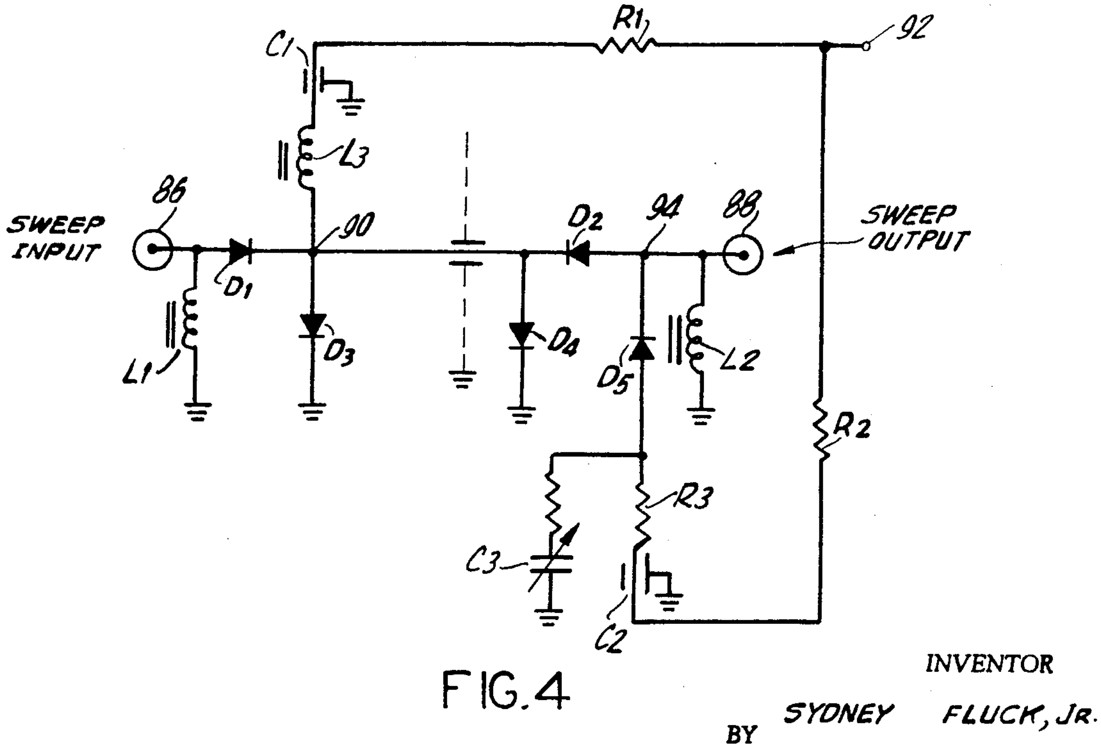
FIG. 4 is a schematic diagram of the diode switch employed in the transmitter portion of FIG. 2.

FIG. 4 schematically illustrates the diode switch 54 of the test signal transmitter. As noted above, switch 54, when conductive, passes the swept pulse to cable 11, and when nonconductive presents an output impedance which substantially matches the characteristic impedance of the cable, which is here assumed to be 75 ohms.

The sweep input from sweep generator 24 is applied at a terminal 86. That terminal is coupled to the sweep output terminal 88, to which cable 11 is connected, through a pair of oppositely poled diodes D1 and D2. A pair of R-F chokes L1 and L2 are respectively connected between input and output terminals 86 and 88 and ground, and a diode D3 is connected between a point 90, defined between diodes D1 and D2, and ground. A diode D4 is connected in parallel with diode D3 between the cathode of diode D2 and ground.

The pulse drive from diode switch drive 52 is applied at terminal 92, which in turn is connected to point 90 through a resistor R1, a feed-through capacitor C1, and R-F choke L3. Terminal 92 is also connected to a point 94 through a resistor R2, a feed-through capacitor C2, a resistor R3, and a diode D5. A resistor R4 and a variable capacitor C3 are connected in series between one side of resistor R3 and ground.

In operation, when the negative 2ms test pulse is present at terminal 92, diodes D1 and D2 are both forward-biased and thus conductive, and diodes D3, D4 and D5 are all reverse-biased and thus nonconductive. As a result, input terminal 86 is coupled through the conducting diodes D1 and D2 to output terminal 88, and the swept-frequency test signal is passed through to terminal 88.

On the other hand, when the test pulse is not present at terminal 92, that terminal is positive, diodes D1 and D2 are reversed-biased and nonconductive, and diodes D3, D4 and D5 are all forward-biased and thus conductive. As a result, the input impedance to the sweep input signal is high and is mainly a function of the high impedance of choke L1. At the same time, the conduction of diode D5 provides output terminal 88 with a termination consisting of resistor R3 connected in parallel to ground with resistor R4 and capacitor C3.

By the proper selection of the values of resistors R3 and R4 and capacitor C3, the output impedance of terminal 88 can be made to match the characteristic impedance of cable 11. For matching the diode switch output with a 75-ohm cable over the frequency range of interest, resistor R3 may be 71 ohms, resistor R4, 56 ohms, and capacitor C3, 1 to 10 pf.

Thus, when switch 54 is in the open condition during the 2 ms. sweep period, the test signal is coupled to the broadcast signal at coupler 12. At all other times, the sweep signal is isolated from the system, and a match at the output terminal of the diode switch is automatically maintained on cable 11, thereby minimizing the interference of the test signal apparatus on the CATV system as is desired.

Figure 5:
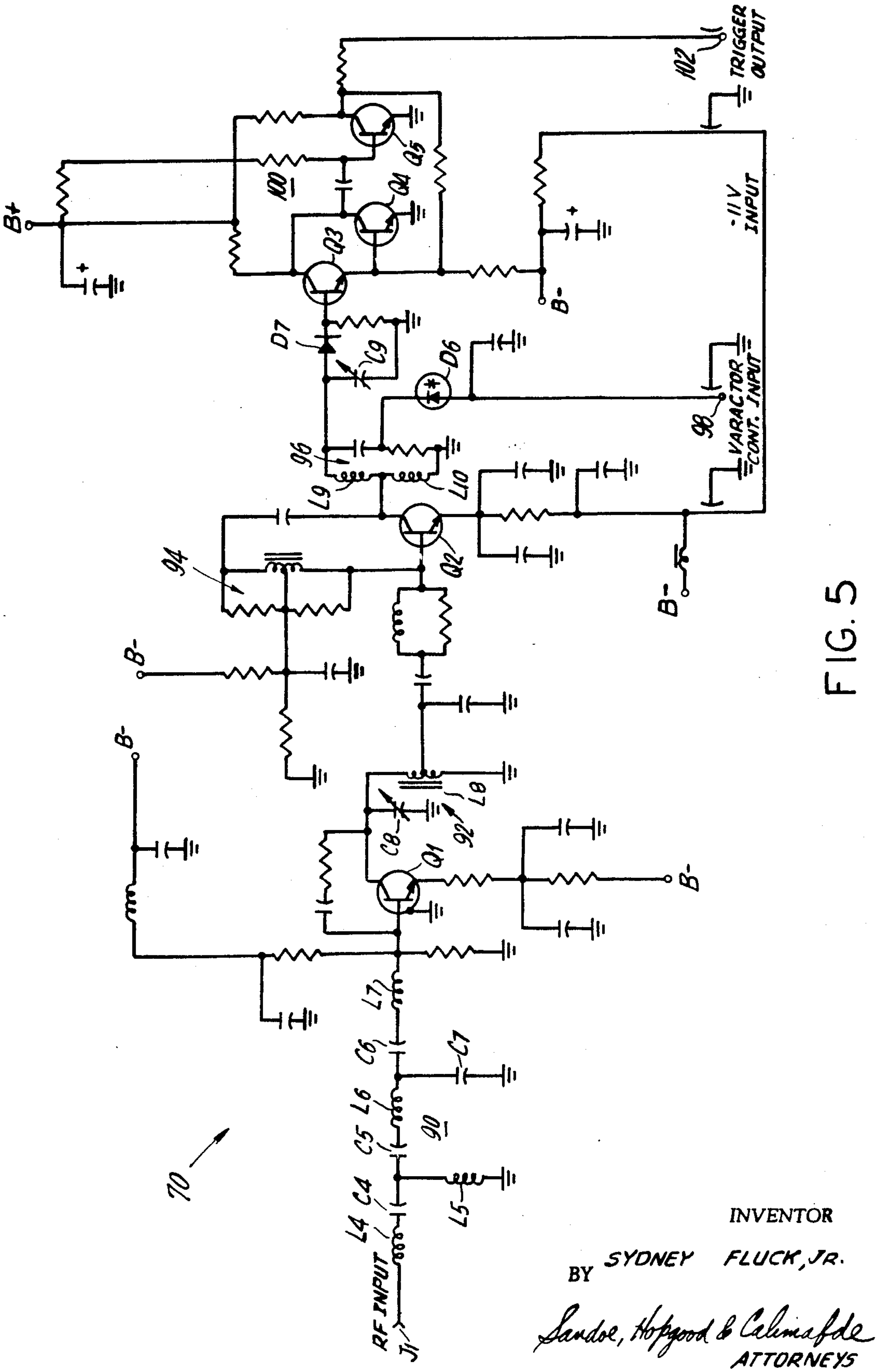
FIG. 5 is a schematic diagram of the trigger generator employed in the test receiver portion of FIG. 3.

FIG. 5 schematically illustrates the trigger generator 70 of the test receiver. As noted above, generator 70 senses the presence of the swept test signal on line 14, and reliably produces a tunable trigger near the lower end of the VHF band e.g., 45 to 55 mHz.) as the swept frequency test signal passes through that frequency. The trigger so produced enables the storage oscilloscope 22 to display and capture the frequency response of the CATV transmission system from the point of time of the production of the trigger each time the trigger is generated by generator 70. The sensitivity of generator 70 is such that the scope trigger is reliably generated even when the R-F test signal input is 10 db. down below a nominal level.

The R-F signal obtained from 10 db. coupler 68 is received at trigger generator 70 at an R-F input connector J1 and passes through a 45–55 mHz. $\pi$-section band pass filter 90 consisting of inductors L4–L7 and capacitors C4–C7, to the input of an amplifier stage including transistor Q1 which is suitably biased as shown. The output collector circuit of transistor Q1 includes a tank circuit 92 consisting of a variable capacitor C8 connected in parallel with a coil L8.

The output of tank circuit 92 is obtained from a tap on coil L8 which is coupled to the input of a tuned amplifier stage consisting of a suitably biased transistor Q2. Broadband neutralization is provided for transistor Q2 over the 45–55 mHz. bandwidth by means of a neutralization network 94 coupled across the collector and base of the transistor.

A high-Q tuned circuit 96, connected in the collector circuit of transistor Q2, comprises inductors L9 and L10, a variable capacitor C9, and a variable-capacitance diode or varactor D6. Tank circuit 96 is tuned to a preselected resonant frequency in the 45–55 mHz. range by the adjustment of capacitor C9 and the variation of the varactor control voltage applied at terminal 98. The number of windings of inductors L9 and L10 is chosen such that the impedance of tank circuit 96 is matched to the impedance of a high-impedance detector diode D7 which detects the R-F signal at the amplifier R-F signal at the frequency determined by tank circuit 96. Thus, as the frequency-swept test signal passes through the tuned frequency of tank circuit 96, detector diode D7 produces a positive-going pulse. That pulse is applied to the input of an isolating stage consisting of a transistor Q3, connected in a Darlington arrangement with a transistor Q4. The latter in combination with a transistor Q5 defines a one-shot multivibrator 100 which, upon the presence of the detected pulse, produces at a terminal 102, a constant amplitude and fixed duration trigger used to trigger oscilloscope 22.

Figure 6:
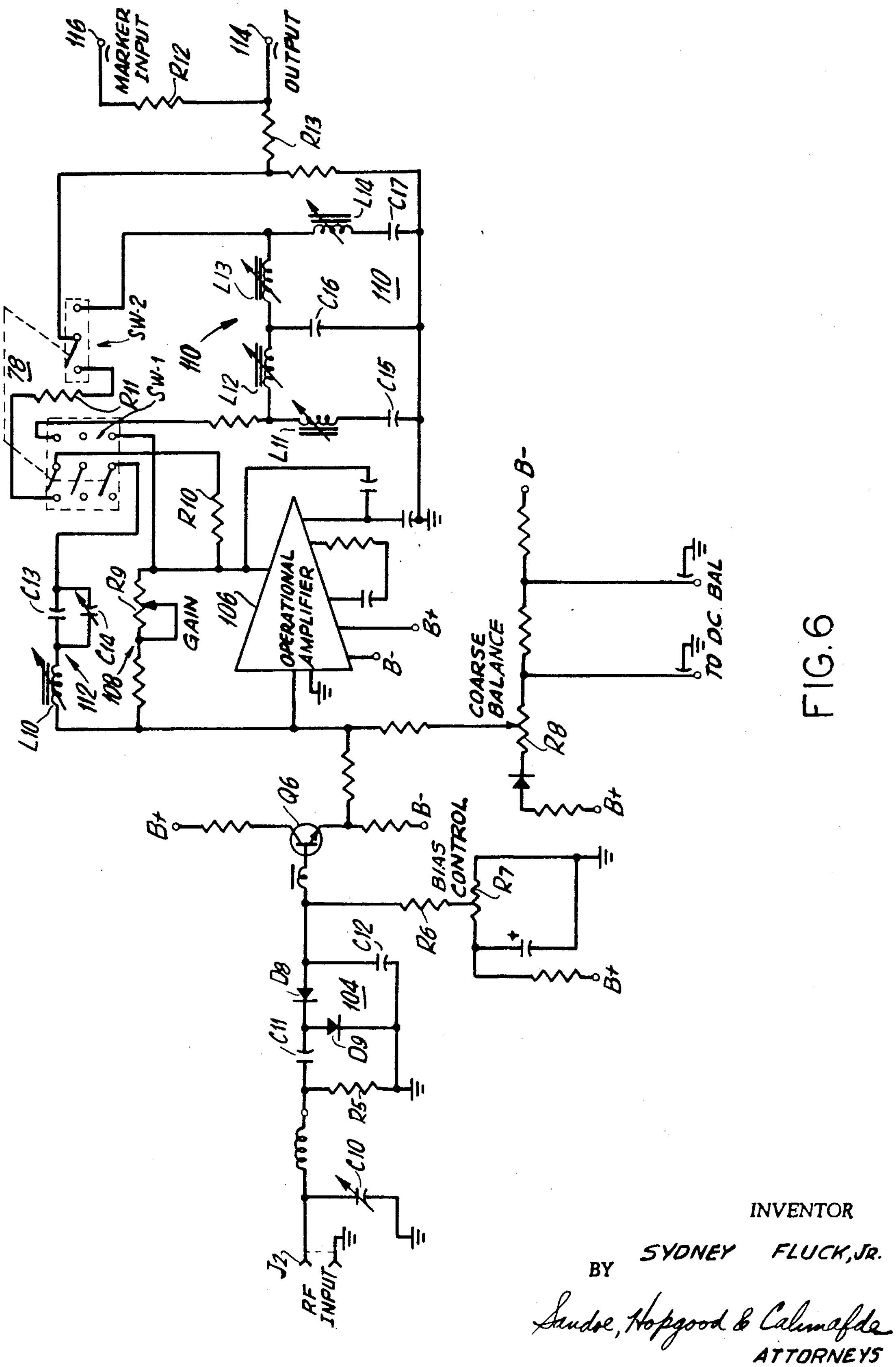
FIG. 6 is a schematic diagram of the detector-amplifier in the test receiver portion of FIG. 3.

FIG. 6 schematically illustrates the detector-amplifier 76 of the test receiver of the invention. The R-F input from coupler 68 is applied to detector-amplifier 76 at R-F input terminal J2 across which an impedance-matching variable capacitor C10 is connected. Input terminal J2 is connected to a bridging detector 104 comprising a resistor R5, capacitors C11 and C12 and diodes D8 and D9. A point 106 of detector 104 is connected through a resistor R6 to the wiper arm of a bias-control, variable resistor R7, and to the base of a transistor Q6 connected to operate as an emitter follower.

Resistor R7 is adjusted to provide a DC bias at point 106 to provide maximum sensitivity of detector 104. The DC biasing of the detector and the base of transistor Q6, derived from a common source, also provides temperature compensation. A change in the detector gain as a result of temperature variation is now primarily a result only of temperature-sensitive variations in the DC bias level. However, this bias level variation is also reflected at the base of transistor Q6 to vary the gain of that transistor in an opposite and substantially equal sense to the temperature-sensitive gain variation of the detector. As a result, the detector-amplifier operation is substantially unaffected by changes in temperature. Moreover, the DC biasing of detector 104 along with the provision of capacitor C12 and resistor R6 provides the detector with a substantially constant output impedance so that the bandwidth of the detector, which is preferable in excess of 50 kHz., is maintained substantially constant irrespective of the test signal level.

The emitter-follower transistor Q6 also provides a low impedance source to the input of an operational amplifier 106. A DC voltage obtained from a coarse balance variable resistor R8 is summed at the input of amplifier 106 to cancel out the effect of the DC detector biasing voltage at transistor Q6 so that the output of the amplifier 106 reflects only the RF input signal to the amplifier. A feedback path 108 including a gain-control variable resistor R9 is connected across the input and output of amplifier 106. Amplifier 106 preferably provides a gain of between 12 and 14 db. with a basic bandwidth in the range of 150 kHz.

Ganged resolution switch 78 consists of switches SW-1 and SW-2 and is selectively operable as stated above to vary the bandwidth and thus the resolution of the amplifier. When the resolution switch is in its normal position for low-bandwidth (10 kHz.) operation, the bandwidth is controlled by a low-pass *m*-derived filter 110 connected to the output of the amplifier, and a high-Q tuned circuit trap circuit 112 is switched into the feedback circuit of the amplifier.

Tuned circuit 112 consists of a capacitor C13 in parallel with a trimmer capacitor C14, connected in series with an inductor L10 to define a high-Q series resonant circuit tuned to resonance at 15.750 kHz. Tuned circuit 112 thus provides a trap for the line sync signals at that frequency from the detected video response to reduce the interference of those signals on the test display. Low pass filter 110 consisting of inductors L11, L12, L13, and L14 and capacitors C15, C16 and C17 is designed in a practical embodiment of the circuit, to operate with a 1 kilohm source and into a 1 kilohm load, while providing a video bandwidth of 11 kHz. with greater than 60 db. rejection to 31.5 kHz.

When switch 78 is positioned in the high position, filter 110 becomes disconnected from output terminal 114 and tuned circuit 112 is no longer connected across the amplifier. In this position of the resolution switch, the low-pass filter 110 is replaced by a resistive network consisting of resistors R10 and R11 which produce a substantially equal loss as that provided by the filter. The bandwidth of the circuit in this condition of switch 78, however, is now determined solely by the time constant of detector 104, and is greater than 50 kHz. The frequency marker pulse derived from meter 20 is applied at terminal 116 when switch 84 (FIG. 2) is in the "ON" position, and is added to the video output of the amplifier by a summing network consisting of resistors R12 and R13.

The CATV monitoring system of the present invention is thus capable of performing reliable and meaningful tests of the performance of a CATV transmission line system simultaneous with the transmission of normal broadcast signals along the line to the subscribers' home receivers, without causing any discernible interference or disturbance of the reception at those receivers. For example, as in an operative embodiment of the invention, the test signal is swept from 45 mHz. to 245 mHz. in a 2 ms. period, and the frequency sweep thus passes through a 200 mHz. range at a rate of 1 mHz./10 $\mu$sec. Therefore, the test signal appears in any VHF TV channel having a 6 mHz. bandwidth for 60 $\mu$sec, or approximately only one line of the raster. The position of this line in any channel is completely random and its appearance on a television receiver is similar to that resulting from a shot of ignition noise. The resulting interference has been found noticeable only to a trained observer, and is essentially imperceptible to the average viewer.

While the invention has been herein disclosed for use in monitoring a CATV system, it may clearly be applied to other communications systems for similar purposes. Thus, while only a single embodiment of the invention has been herein specifically disclosed, it will be obvious that modifications may be made therein all without departing from the spirit and scope of the invention.

We claim:

1. Apparatus for monitoring the operation of a communications system such as a CATV system or the like of the type having a head end, and means coupled to the head end for transmitting broadcast signals at frequencies covering a plurality of R-F channels from the head end to a plurality of receivers remote from said head end, said monitoring apparatus comprising means for sequentially applying a plurality of discrete swept-frequency test pulse signals to said transmitting means without disconnecting said broadcast signals therefrom, means coupled to said transmitting means for combining said broadcast and test signals on said transmitting means, said test signals each having a range of frequencies falling in the frequency range of said channels, having a predetermined duration, and appearing at a predetermined rate, the period between said test signals being significantly greater than their predetermined duration, and means coupled at a selected point along said transmitting means intermediate said combining means and said receivers for sensing a predetermined parameter of said transmitted swept-frequency test signals.

2. The apparatus of claim 1, in which said test signals are frequency-swept pulses each of a duration in the order of 2ms, and produced at a rate of between once each second and once every 20 seconds.

3. The apparatus of claim 1, in which said test signal applying means comprises a frequency sweep generator, and pulse control means coupled to said sweep generator and including means for generating a timing pulse of said predetermined duration and at said predetermined rate, means for forming from said timing pulse a frequency varying signal for controlling the output frequency of said sweep generator, and switch means responsive to said timing pulse and receiving the output of said sweep generator for generating said frequency-swept pulses.

4. The apparatus of claim 3, in which said frequency-varying signal forming means includes means for integrating said timing pulse to thereby form a ramp-like signal having a width corresponding to the duration of said timing pulse.

5. The apparatus of claim 2, in which the frequency of said test signal falls within the frequency band of each of said RF channels for a period in the order of 60 microseconds.

6. The combination of claim 1, in which said test signal applying means comprises means for transferring said test signals to said combining means only during the duration of said test signals, and for presenting a matching impedance to said coupling means at all other times.

7. The apparatus of claim 1, in which said test signal sensing means comprises means for displaying the frequency response of said transmitting means to said test signals, and means for indicating the level of said test signal at said selected point.

8. The apparatus of claim 7, in which said displaying means includes means for initiating the display at a frequency at which the test signal level is below a nominal test signal level by a predetermined amount.

9. The apparatus of claim 8, in which said displaying means in an oscilloscope, said initiating means including means for producing a triggering pulse for said oscilloscope at the predetermined lower test signal level when the frequency sweep of the test signal passes a predetermined frequency.

10. The apparatus of claim 7, further comprising means for producing a marker pulse at a predetermined frequency for combination with said display.

11. The apparatus of claim 7, in which said detecting means comprises an amplifier section, and means for selecting one of a narrow and a wide bandwidth of said amplifier section, to thereby select the resolution of said display.

12. The apparatus of claim 7, in which said displaying means comprises means for detecting said test signal, amplifying means coupled to said detecting means, and means for applying a common DC bias signal to said detecting means and said amplifying means for providing temperature-compensation to said detecting and amplifying means, and for maintaining a substantially constant bandwidth for said detecting means.

13. The apparatus of claim 12, further comprising second amplifying means coupled to said first-mentioned amplifying means, and means for applying a signal to second amplifying signal to compensate for the DC bias signal applied to said first amplifying means.

14. The apparatus of claim 13, further comprising means for coupling one of a selected narrow or wide bandwidth determining circuit to the output of said second amplifying means.

15. A method of monitoring the performance of a communications system such as a CATV system or the like in which a broadcast signal is transmitted along a line to a plurality of receivers coupled to the end of said line, said method comprising the steps of producing a train of frequency-swept test pulse signals of a predetermined duration and at a predetermined rate, the period between adjacent ones of test signals being significantly greater than said duration, combining said test signals with said broadcast signals at a signal combining point on said line for the simultaneous transmission of said test and broadcast signals along said line, and sensing a predetermined parameter of said combined test and broadcast signals at a test point located along said line at a location intermediate said combining point and the end of said line.

16. The method of claim 15, in which said test signals are frequency-swept pulses each of a duration in the order of 2 ms., and produced at a rate of between once each second and once every 20 seconds.

* * * * *